United States Patent
Pelletier

(10) Patent No.: US 8,706,814 B2
(45) Date of Patent: *Apr. 22, 2014

(54) METHOD AND APPARATUS FOR LAYERING SOFTWARE AGENTS IN A DISTRIBUTED COMPUTING SYSTEM

(75) Inventor: James Pelletier, Bridgewater, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,139

(22) Filed: Sep. 1, 2012

(65) Prior Publication Data

US 2012/0331035 A1     Dec. 27, 2012

Related U.S. Application Data

(63) Continuation of application No. 11/323,289, filed on Dec. 29, 2005, now Pat. No. 8,260,739.

(51) Int. Cl.
G05B 19/042 (2006.01)
H04L 29/08 (2006.01)
G05B 13/04 (2006.01)
G05B 15/02 (2006.01)

(52) U.S. Cl.
CPC ........ G05B 19/042 (2013.01); H04L 29/08135 (2013.01); G05B 13/042 (2013.01); G05B 13/048 (2013.01); G05B 15/02 (2013.01)
USPC ................ 709/205; 709/201; 700/9; 700/29; 700/32

(58) Field of Classification Search
CPC .... G05B 19/042; G05B 13/048; G05B 15/02; H04L 29/08135
USPC ................... 700/1–4, 9, 28–36; 709/201–207
See application file for complete search history.

(56) References Cited

U.S. PATENT DOCUMENTS 5,740,075 A     4/1998   Bigham et al.
6,496,871 B1   12/2002   Jagannathan et al.

(Continued)

FOREIGN PATENT DOCUMENTS

JP       2005085274  A       3/2005
JP     02005085274  A   *   3/2005    ............... G06F 3/00

OTHER PUBLICATIONS

Microsoft TechNet. "How DNS Works". http://technet.microsoft.com/en-us/library/cc772774(WS.10).aspx Last Updated: Mar. 28, 2003.

(Continued)

*Primary Examiner* — Ashok Patel
*Assistant Examiner* — Kevin Bechtel

(57) ABSTRACT

In one embodiment, the present invention is a method and apparatus for layering agents in a distributed computing system. In one embodiment, a system for monitoring and controlling a distributed computer network including a plurality of components (e.g., devices) includes a plurality of cells, each of the cells being deployed to directly monitor and control one of the components of the network. The system also includes at least one federation, where the federation is made up of cells that cooperate to solve common problems, and at least one supercell, where the supercell provides supplemental decision making capabilities to the cells and federations. In this manner, problems detected by a cell that cannot be resolved by the cell may be forwarded to the cell's associated federations or supercells for resolution.

18 Claims, 6 Drawing Sheets

(56) References Cited

U.S. PATENT DOCUMENTS

| | | |
|---|---|---|
| 6,513,059 B1 * | 1/2003 | Gupta et al. ............ 709/202 |
| 6,742,141 B1 * | 5/2004 | Miller ................ 714/26 |
| 6,772,350 B1 | 8/2004 | Belani et al. |
| 6,785,834 B2 | 8/2004 | Chefalas et al. |
| 6,950,875 B1 | 9/2005 | Slaughter et al. |
| 8,260,739 B1 | 9/2012 | Pelletier |
| 2003/0028825 A1 | 2/2003 | Hines |
| 2004/0070920 A1 | 4/2004 | Flueli |
| 2004/0139426 A1 | 7/2004 | Wu |
| 2004/0205414 A1 * | 10/2004 | Roselli et al. ............ 714/39 |
| 2004/0249971 A1 | 12/2004 | Klinker |
| 2005/0015678 A1 | 1/2005 | Miller |
| 2006/0013229 A1 * | 1/2006 | Johansson et al. ...... 370/395.41 |
| 2006/0036563 A1 * | 2/2006 | Wu ......................... 706/59 |

OTHER PUBLICATIONS

Webster's New World College Dictionary—Hosted: http://www.yourdictionary.com/.

* cited by examiner

METHOD AND APPARATUS FOR LAYERING SOFTWARE AGENTS IN A DISTRIBUTED COMPUTING SYSTEM

This application is a continuation of U.S. patent application Ser. No. 11/323,289, filed Dec. 29, 2005, which is currently allowed, and is herein incorporated by reference in its entirety.

FIELD OF THE INVENTION

The present invention relates generally to distributed computing systems and relates more particularly to software agents for monitoring and controlling distributed computing systems.

BACKGROUND OF THE INVENTION

A distributed computing system is one in which geographically distributed users and resources are connected in a transparent, open manner. Distributed computing systems offer many benefits, such as survivability, robustness and reliability. That is, a distributed computing system will not necessarily fail just because one component of the system fails. Moreover, distributed computing systems are fairly easy to scale.

In some cases, distributed computing systems are agent-based. That is, some decision making processes are delegated to "agents" (autonomous or semi-autonomous software programs) that are deployed throughout the system. These agents are tasked with specific goals or missions, such as monitoring and controlling devices or resources to which they are assigned.

One drawback to implementing an agent-based architecture in a distributed computing system is the difficulty in scaling the system. For example, for larger distributed computing systems requiring greater numbers of agents, it is difficult to coordinate the activities of the agents. Monitoring and troubleshooting in the distributed computing system thus becomes a complicated task.

Thus, there is a need in the art for a method and apparatus for layering software agents in a distributed computing system.

SUMMARY OF THE INVENTION

In one embodiment, the present invention is a method and apparatus for layering agents in a distributed computing system. In one embodiment, a system for monitoring and controlling a distributed computer network including a plurality of components (e.g., devices) includes a plurality of cells, each of the cells being deployed to directly monitor and control one of the components of the network. The system also includes at least one federation, where the federation is made up of cells that cooperate to solve common problems, and at least one supercell, where the supercell provides supplemental decision making capabilities to the cells and federations. In this manner, problems detected by a cell that cannot be resolved by the cell may be forwarded to the cell's associated federations or supercells for resolution.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
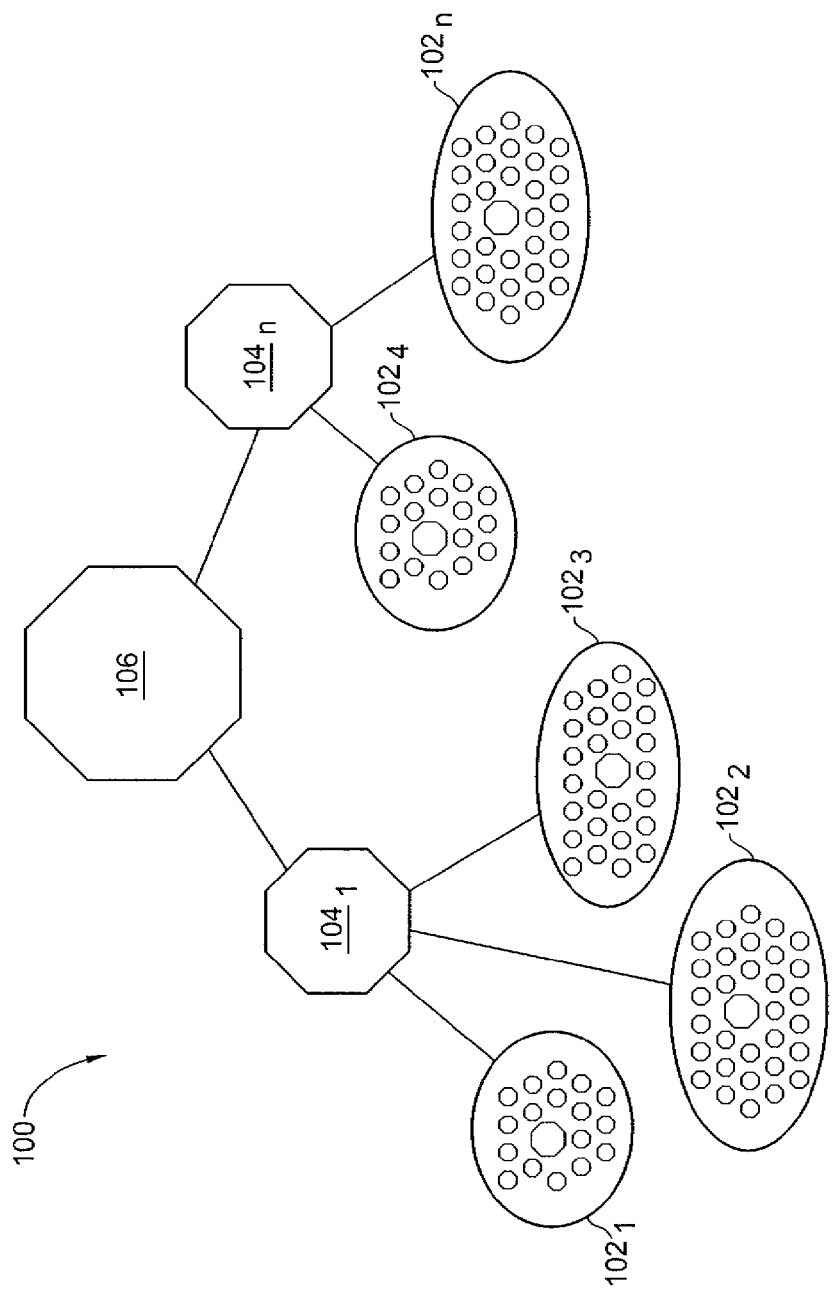
FIG. 1 is a schematic diagram illustrating one embodiment of a hierarchical system of agents, according to the present invention.

In one embodiment, the present invention relates to a method and apparatus for layering software agents in a distributed computing system. Embodiments of the present invention organize agents into a hierarchical system that supports substantially autonomous functionality by grouping agents according to how they relate to other agents. This facilitates the coordination and control of large numbers of agents. Thus, while the hierarchical system implements some types of centralized control mechanisms for tasks such as problem solving, the system also retains some of the advantages of distributed systems such as survivability, robustness and reliability.

Embodiments of the present invention are based on the use of agents—autonomous or semi-autonomous (e.g., flexible enough to take independent action in a dynamic setting) task-oriented software entities that are deployed to monitor and/or control components of a computing system. Agent tasks may include problem identification, troubleshooting, device configuration, adaptive action and resource interfacing, among others. To this end, agents possess rudimentary expertise in the functions necessary for the execution of their tasks. An agent's basic behavior is defined by a set of primitives common to all agents, where the primitives define the course of last resort for an agent when all other options have failed. In some embodiments, agents further include additional layers of software, where each layer defines a particular type of behavior (e.g., possibly confidence-ranked courses of action to take in response to defined events). Agents can also modify their behavior by learning from past experiences, from observations, from other agents or through code transfers from trusted sources, thereby synthesizing new problem solutions.

Agents are capable of perceiving their environments and acting on those perceptions (e.g., by obtaining and applying the appropriate resources). Operating environments are viewed through sensors or resources, so that agents may derive local maps of their operating environments and tailor their responses to local conditions. An agent's perception of its operating environment forms the starting point for any planned action in response to a triggering event (e.g., an alarm, an alert, a detected anomaly, etc.). Agents are goal or task driven, with a demonstrated temporal continuity in the pursuit of their goals or tasks. To this end, agents operate asynchronously with the ability to react substantially and immediately to triggering events.

Agents are also capable of interacting with other agents, for example to negotiate the use of resources. An individual agent is responsible not only for identifying the resources necessary to complete a task, but for locating and negotiating with other agents that can provide the resources. For example, an agent negotiates the terms of communication and the ground rules for the relationship with the other agent(s).

In one embodiment, the present invention contemplates the use of two types of agents: static agents and mobile agents. Static agents are resident agents that remain in one location, while mobile agents can migrate from one location to another (e.g., by physically leaving a location or by being produced by another agent). While mobility can enhance an agent's effectiveness, all solutions will not require agent mobility. Mobility may be useful, for example, where an agent requires more resources than its associated cell can provide, or where the agent is required to sort through large amounts of data. In one embodiment, static agents are sufficient for most simple informational queries (e.g., queries that require short or simple answers, such as queries that can be handled through a secure sockets layer or secure shell tunnel); mobile agents are used for more complex queries where large volumes of data and/or more resources are involved.

FIG. 1 is a schematic diagram illustrating one embodiment of a hierarchical system 100 of agents, according to the present invention. In the system 100, agents are grouped into a plurality of different entities having different tasks and capabilities. In one embodiment, these entities comprise one or more hives $102_1$-$102_n$ (hereinafter collectively referred to as "hives 102"). In further embodiments, the entities forming the system 100 further comprise one or more ecospheres $104_1$-$104_n$ (hereinafter collectively referred to as "ecospheres 104") and one or more biospheres 106.

Hives 102 are entities that function substantially independently within associated mission parameters and are capable of adapting to changing conditions. A hive 102 comprises a plurality of autonomous entities including cells and agents, described in greater detail below in connection with FIGS. 2-3. The autonomy of a hive 102 confers flexibility, adaptability and continuity in situations where connectivity may be lost or erratic. In one embodiment, the hive 102 is the minimum structure or entity required for the hierarchical system 100 to accomplish its associated tasks.

A hive 102 is tasked with monitoring and controlling a given device (e.g., hardware or software) and comprises one or more cells (illustrated further in FIG. 2), or hosting environments for agents and resources (e.g., similar to a Java container). Common-level cells within a hive 102 (i.e., cells that reside at the same hierarchical level in the system 100) are peers—that is, cells within a hive 102 that are common-level entities can communicate with each other and can share their associated resources among themselves. Cells within a hive 102 will typically differ in their respective extents of physical resources (e.g., central processing unit performance, random access memory, disk, peripherals, etc.), in the types of resources attached to the respective cells and in the missions of the respective cells within the hive 102. In one embodiment, a peer grouping of cells within a hive 102 that share similar missions and resources may form a federation, or a collaborative environment for sharing knowledge and resources at the cell level. In another embodiment, a hive 102 includes at least one supercell having added resources that permit it to help maintain and coordinate the hive 102 as a whole.

Ecospheres 104 organize and control one or more hives 102 while providing decision-making and in-depth support to the hives 102. Thus, in contrast to lower-level system entities (e.g., those included in hives 102) that operate on a tactical level, ecospheres 104 operate on both a tactical level and a strategic level, handling system policies and policy enforcement. To this end, ecospheres 104 concentrate on mission issues that affect all hives 102 under their control. In one embodiment, ecospheres 104 also function as a court of last resort for questions that cannot be resolved by lower-level system entities. In one embodiment, problems referred to ecospheres 104 do not have reflexive responses (whereas problems referred to entities within a hive 102 might have such responses); however, the reaction time of an ecosphere 104 is quicker than that of a human. Ecospheres 104 are peers in relation to other ecospheres 104.

Biospheres 106 coordinate one or more ecospheres 104 and thus represent the highest-level entity in the system 100. Biospheres 106 define business models, goals and priorities and thus describe, at a high level, interactions between different missions or tasks within the system 100. Like ecospheres 104, biospheres 106 provide computing-intensive services that may not be practically provided by lower-level system entities (e.g., hives 102 or ecospheres 104), such as entity coordination, problem solving services, archiving and data analysis. For example, a biosphere 106 might represent at least a portion of the business of a networking company whose customers are represented by ecospheres 104. Each customer location (e.g., various office locations) could be represented by a hive 102 that monitors network devices at that location and that reports to the associated customer's ecosphere 104. Biospheres 106 are peers in relation to other biospheres 106.

A hierarchical system 100 of agents such as that described provides substantially autonomous functionality by grouping agents according to how they relate to other agents, and providing each group with a more intelligent entity to which it can refer problems or tasks that it cannot resolve itself. Each grouping within the system 100 comprises entities (e.g., cell, ecosphere, biosphere, etc.) that are peers in relation to other common-level entities. Each progressively higher-level grouping is more powerful (e.g., has access to more resources and knowledge and is more capable) than its predecessor(s). This facilitates the coordination and control of large numbers of agents. Thus, while the system 100 implements some types of centralized control mechanisms for tasks such as problem solving, the system 100 also retains some of the advantages of distributed systems such as survivability, robustness and reliability.

Although the system 100 is substantially autonomous, a human operator may in some embodiments be considered a final, highest-level entity in the system. That is, there may be times when, despite the sophisticated structure of the system 100, human intervention will be necessary to address certain varied or nuanced problems. In one embodiment, human input can thus occur at any level of the system (e.g., at the hive level, the biosphere level, the ecosphere level, etc.). In another embodiment, human input most commonly occurs at the highest operational level (i.e., the ecosphere 106), because this level is the concentration point for data flowing upward from the lower-level entities.

Human intervention may also be necessary in order to assess whether the mission of the system 100 is being successfully accomplished, or whether hardware incorporated in the system 100 is functioning properly.

Figure 2:
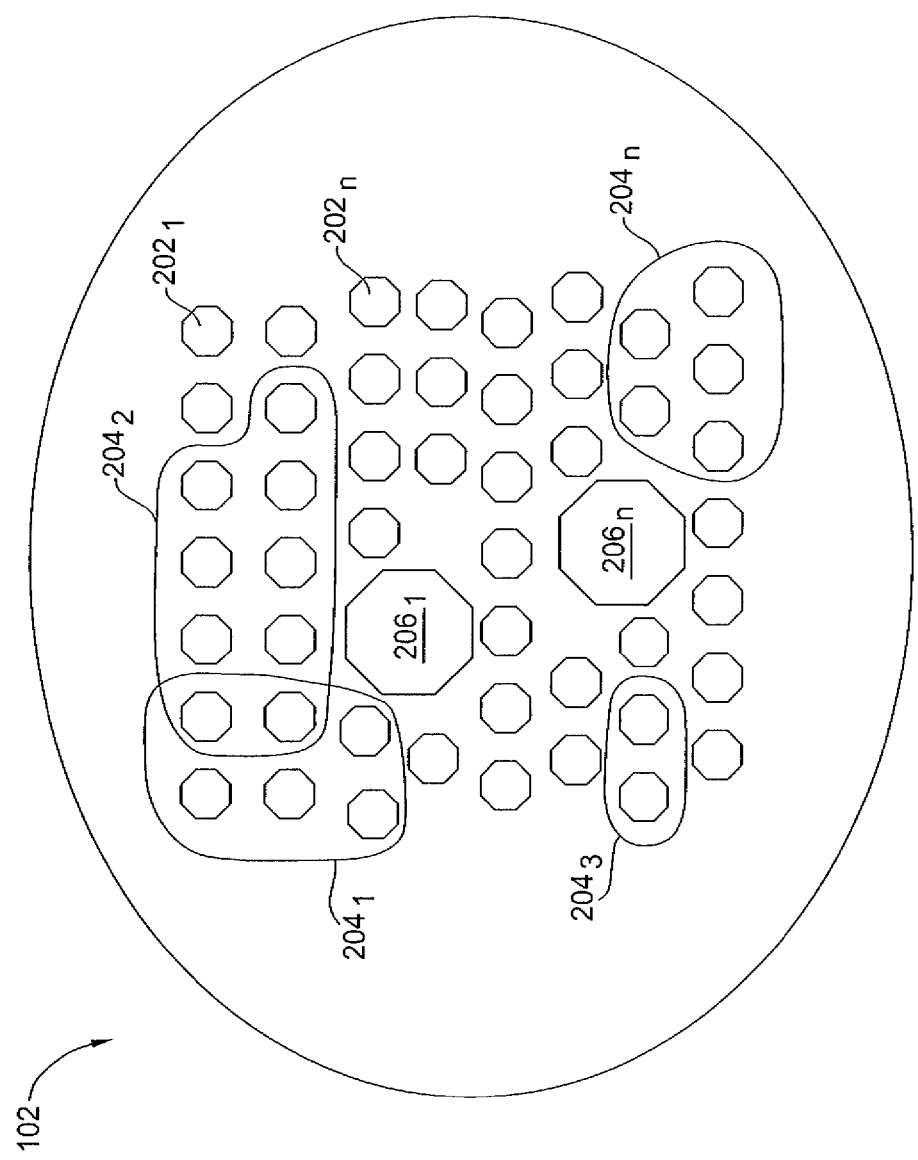
FIG. 2 is a schematic diagram illustrating one embodiment of a hive, according to the present invention.

FIG. 2 is a schematic diagram illustrating one embodiment of a hive 102, according to the present invention. The hive 102 is part of a hierarchical system of agents, such as the system 100 illustrated in FIG. 1. The hive 102 comprises a plurality of different entities, including cells $202_1$-$202_n$ (hereinafter collectively referred to as "cells 202"), cell federations $204_1$-$204_n$ (hereinafter collectively referred to as "federations 204") and supercells $206_1$-$206_n$ (hereinafter collectively referred to as "supercells 206").

Cells 202 form the lowest layer in the hierarchy of the system 100, as well as the lowest level of complete hive functionality. Cells 202 are autonomous entities that support the hive's mission by directly interfacing with hardware and/or software systems, collecting information pertinent to their assigned tasks, and (when required) analyzing data to determine a course of action. As described in further detail below, cells 202 perform these functions via agents (and the agents' associated resources) contained within the cells; the cells are merely the hosting environments for the agents and resources. Thus, the cells 202 are essentially the "eyes and ears" of the hive 102. The extent of a cell's abilities and self-sufficiency is determined by its physical resources, as described in greater detail below with respect to FIG. 3. As described above, cells 202 are peers in relation to other cells 202.

A cell 202 also maintains two lists that assist the cell 202 in performing its assigned tasks. The first list is a table of federations 204; the second list is a table of the cell's nearest neighbor neighbors (i.e., other cells). In one embodiment, the "nearness" of a cell's neighbor is based on at least one of: the neighbor's location in the network, the neighbor's Internet Protocol (IP) address, the hop count between the cell 202 and the neighbor, the neighbor's index number or the neighbor's physical location. In one embodiment, the table of nearest neighbors is provided to the cell 202 by a higher-level entity in the hierarchical system (e.g., a supercell 206). Cells 202 and nearest neighbors may observe each other using simple pings (e.g., maintaining records of which neighbors respond to the pings), which enable cells 202 to construct rough views of their immediate neighborhoods. Information regarding neighbors that fail to respond may be forwarded to a higher-level entity in the system 100 for analysis. Cells 202 may also use nearest neighbors for alternate routing purposes, for example where a cell 202 loses connectivity to a higher-level entity in the system 100. Alternate routes can be constructed through one or more nearest neighbors.

Federations 204 form the next-highest layer (after cells 202) in the hierarchy of the system 100. Federations 204 are groups of loosely organized cells 202 having similar missions, tasks or areas of interest. In one embodiment, the federation structure facilitates peer-to-peer interactions between member cells 202 contained within a federation 204. In further embodiments, cells 202 that are members of different federations 204 are also capable of peer-to-peer interactions. In one embodiment, a federation 204 comprises a plurality of cells 202 having similar resources, so that the cells 202 may share knowledge. For example, cells 202 having resources that support the same type of hardware (e.g., a certain brand of router) may be grouped as a federation 204. However, the cells 202 that make up a federation 204 do not necessarily have to be in close physical proximity, or even in the same network (e.g., nearest neighbors are not necessarily members of the same federation 204), and do not necessarily need to have similar resources. Federations 204 may vary by size (e.g., depending on geographic, network or resource considerations). In one embodiment, federations 204 are permanent groupings; however, in another embodiment, agents are capable of migrating to new federations 204 (e.g., if the agents' tasks, missions or resources change). In one embodiment, cells 202 migrate to new federations 204 only at the direction of a higher-level entity (e.g., a supercell 206), and do not migrate at their own discretion.

Federations 204 may overlap with each other, as illustrated by the overlap of federation $204_1$ and federation $204_2$ in FIG. 2. That is, while a single agent may belong to only one federation, the cell 202 containing the agent may also include other agents belonging to other federations; thus, the single cell 202 may be considered as belonging to multiple federations. In one embodiment, the assignment of a cell 202 to one or more federations 204 is made by a higher-level entity (e.g., higher than the federation), since such assignment requires knowledge of the hive's global map and of each cell 202.

Federations 204 are formed when each member agent is provided with a list of the federation's other member agents and the resources associated with the other member agents' cells (e.g., storage capacity, central processing unit capacity, etc.). The information pool formed by the member agents, from which agents within the federation 204 can draw, is the "glue" that binds the member agents together.

Although they are described here as being cell- or agent-comprised entities, federations 204 may comprise entities of any level within the system hierarchy, as long as the composition is homogenous (e.g., all federation members are of the same hierarchy level). Thus, in addition to federations of cells 202, there may also exist federations of biospheres 106, federations of ecospheres 104, or federations of supercells 206. Federations 204 may also be formed between supercells 206 in different hives 102, or between ecospheres 104 under the control of different biospheres 106, when there is a general overlap between the federation members. Since these entities have larger responsibilities (e.g., as compared to agents or cells), federation membership is not established simply by assigning a single agent within the supercell or ecosystem to the federation 204. Rather, the entire entity becomes a member of the federation 204. Thus, federation membership at these levels is based more on areas of responsibility or possible interactions between supported devices (e.g., as opposed to the type of device monitored, as is the case with agents).

Supercells 206 form the next-highest layer (after federations 204) in the hierarchy of the system 100. Supercells 206 do not directly monitor physical systems, but rather are tasked with learning and problem resolution functions that help maintain cohesion within the hive 102 by supporting cells, their agents and their associated federations 204. Additionally, a supercell 206 has access to more sophisticated analytical and decision-making tools than do lower-level entities; thus, a supercell 206 may also act as a global resource for the hive 102 and be tasked with processing and extrapolating data produced within the hive 102. Moreover, of all entities within the hive 102, the supercell 206 is the only hive entity that is mission-focused (e.g., "keep this network and all attached devices operating at a level defined by the hive's controlling ecosphere", or "monitor and maintain all network-based devices in building X so that they are fully functional Y percent of the time, as defined by the hive's controlling ecosphere"), striving to ensure that the devices being monitored and controlled by the hive 102 conform to the hive's mission parameters, as understood by the supercell 206. To this end, the supercell 206 has four main tasks within the hive 102.

First, the supercell 206 resolves problems that are referred by lower-level entities (i.e., cells 202 and federations 204). Since supercells 206 posses the greatest intelligence (e.g., in terms of global hive knowledge), resources and solution synthesis insight out of all entities within the hive 102, supercells 206 are best equipped to resolve problems that lower-level entities cannot. The supercell's macro view of the hive 102 also allows the supercell 206 to shift resources within the hive to aid in the resolution of a given problem.

Second, the supercell 206 serves as the main archiving facility for all data from cells (which in turn store agent data), which facilitates the adaptive nature of the hive 102. In cases where a simple rule can be derived to predict the onset of a particular condition simply by examining data as it is collected, the agent monitoring a given device may be able to derive a predictive action to prevent or lessen the condition. However, not all cells will necessarily have the resources to maintain long histories of past events; thus the agents within such cells may not be able to see or predict long-term effects of certain conditions or actions, or even the effects those conditions or actions will have on other devices monitored by other hive agents. The supercell 206, however, does see these effects, and can examine collected data in greater detail for behaviors and trends that can be adaptively exploited in proactive actions to respond to more complicate conditions, thereby preventing failures from occurring in the hive 102. For example, examination of the collected data may indicate a pending failure or significant event, based on previously observed trends or events. In such a case, the supercell 206 can suggest a corrective course of action in an attempt to prevent the impending failure. Thus, the supercell 206 is capable of not only suggesting, but also taking, action without direction from a higher-level system entity.

Third, the supercell 206 is responsible for the administration of activity within the hive 102. The supercell 206 receives periodic status profile updates from cells, which are used to maintain a global map of the hive 102. Status profiles describe their associated cells, providing at least one of: the cell's storage size, the cell's central processing unit capacity, the cell's physical location, the cell's IP address and the cell's resources. The supercell 206 also establishes nearest neighbor lists and federations lists for each cell 202 based on the global map of the hive 102. In one embodiment, creation of nearest neighbor lists and federation lists are further based on criteria defined by a higher-level entity (i.e., an ecosphere 104); the supercell 206 actually assigns the nearest neighbors and federations 204 for each agent based on the guidelines provided by the higher-level entity. Nearest neighbors are most often assigned on a cell basis, while federations are assigned on an agent basis (i.e., a cell 202 can only be assigned to a federation 204 if the cell 202 contains only one agent monitoring one device).

Fourth, the supercell 206 acts as the hive's single point of contact with higher-level system entities (e.g., ecospheres 104, biospheres 106) and with other hives. This simplifies the dissemination of information within the hive 102 and keeps the supercell 206 informed of activities between the hive 102 and the higher-level entities.

Like agents, supercells 206 may form federations 204 to coordinate their activities and to share information and resources. In one embodiment, a hive 102 having more than one supercell 206 designates one of the supercells 206 as a primary supercell 206, while the remaining supercells 206 are secondary supercells 206. Secondary supercells 206 will have regional responsibilities within the hive 102, which are coordinated by the primary supercell 206. In one embodiment, the hierarchy of the multiple supercells 206 is defined by an associated ecosphere 104. In addition, the ecosphere 104 may assign the regional responsibilities to the secondary supercells 206, if assignment is not handled by the primary supercell 206. Supercells 206 may be peers in relation to other supercells 206, but supercells 206 are not peers in relation to regular cells 202.

Referring back to the networking company example discussed with reference to FIG. 1 (i.e., where the networking company was represented by a biosphere 106, the company's customers were represented by ecospheres 104 and individual customer locations were represented by hives 102), a plurality of cells 202 (i.e., the cell's associated agents and resources) could be distributed throughout a customer location as tenant applications running on general servers located throughout the location, where each cell 202 monitors a defined group of devices including the server on which it is operating. These cells 202 could be organized into one or more federations 204 of cells 202 (e.g., that monitor the same types of devices) by a supercell 206 at the customer location, as described above.

Figure 3:
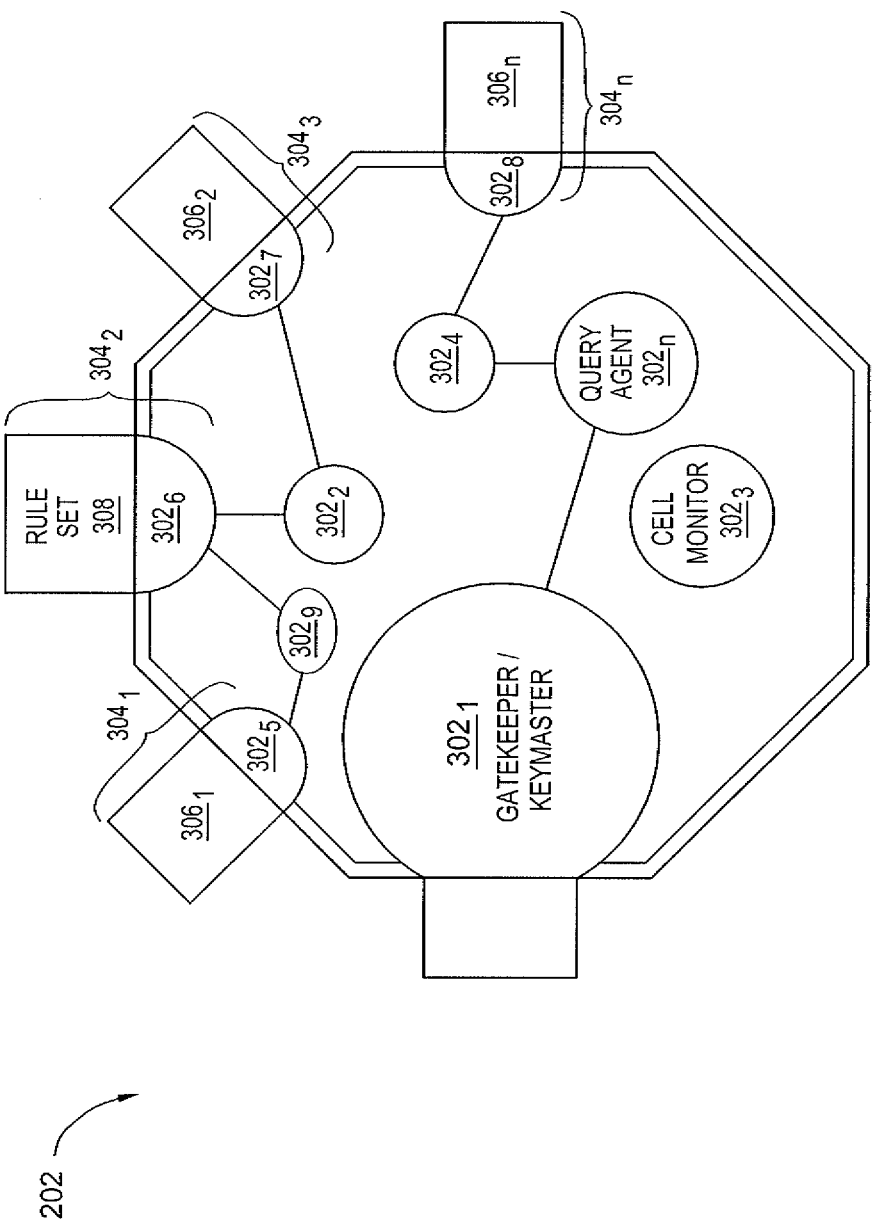
FIG. 3 is a schematic diagram of a cell, according to the present invention.

FIG. 3 is a schematic diagram of a cell 202, according to the present invention. The cell 202 is a component of a hive, such as the hive 102 described in connection with FIGS. 1 and 2. The cell 202 may be a designated area within a computing device, or it may be a dedicated computing device whose capabilities and size are determined by available resources. The restrictions could be physical (e.g., as demonstrated by installing the cell 202 on a computing device with limited processing power and memory) or virtual (e.g., as illustrated by imposed administrative restrictions). In one embodiment, each cell 202 is associated with a single system device (e.g., there is a one-to-one correspondence between cells 202 and system devices). In further embodiments, a cell 202 may be associated with more than one system device; however, in such cases, the cell 202 supports different agents and resources for each system device, as described in greater detail below.

At its most basic, the cell 202 is a hosting site where agents can operate and find the resources necessary for carrying out their tasks. To this end, the cell 202 comprises one or more agents $302_1$-$302_n$ (hereinafter collectively referred to as "agents 302") and one or more resources $304_1$-$304_n$ (hereinafter collectively referred to as "resources 304").

As discussed above, the agents 302 are autonomous or semi-autonomous software entities that are capable of perceiving their environments and acting on those perceptions. In one embodiment, the cell 202 comprises at least one of a plurality of different types of agents, including: a monitoring agent, a cell monitor, a gatekeeper, a keymaster and a resource agent. In general, agents 302 within the cell 202 are quick-response mechanisms for the resources 304 that they monitor.

For example, in FIG. 3, agents $302_2$, $302_4$ and $302_9$ are monitoring agents. Monitoring agents 302 are responsible for external tasks (e.g., external to the cell 202), such monitoring and controlling system devices (e.g., hardware or software) to which they are assigned. Each monitoring agent 302 has an associated task or general mission goal, such as keeping an assigned device operating at maximum efficiency. The monitoring agent 302 monitors the assigned device and controls the assigned device or employs one or more resources, if necessary, in order to carry out the associated task with relation to the assigned resource. Decision making at monitoring agents 302 may be made in accordance with a rule set 308. In one embodiment, a cell 202 comprises only one monitoring agent 302, although, in other embodiments, the cell 202 may comprise more than one monitoring agent 302. In the case where the cell 202 comprises more than one monitoring agent 302, each monitoring agent 302 monitors and controls a different system device (e.g., there is a one-to-one correspondence between monitoring agents 302 and system devices).

In FIG. 3, agent $302_3$ is a cell monitor. The cell monitor $302_3$ is a static agent that is responsible for an internal task (e.g., internal to the cell 202), namely, monitoring operational and performance parameters for all activities within the cell 202. In particular, the cell monitor $302_3$ helps the cell 202 to adapt to accommodate changes within its boundaries. The cell 202 is given a finite amount of resources 304 that must be balanced against what is being requested by agents 302 operating within the cell 202 and against any policies that define acceptable agent actions or resource usage. The cell monitor $302_3$ helps the cell 202 to balance these concerns by maintaining an up-to-date view of all activity within the cell, as well as of what resources 304 are being used. The cell monitor $302_3$ establishes whether or not the individual agents 302 and resources 304 can be supported with existing resources, as well as how many of the cell's resources can be shared with other cells. In one embodiment, the cell monitor $302_3$ estimates how agent and resource changes (e.g., addition of new resources 304, software upgrades, hardware changes, new mission and task parameters, etc.) can be supported based on past experience and guidelines established when the cell 202 was created. The guidelines represent a starting point for resource apportionment, while the past experience enables the cell's operational parameters to be tailored based on the local environment.

The cell monitor $302_3$ controls the allocation of resources within the cell 202 by tracking resource usage within the cell 202 and enforcing resource limits or quotas. Generally, a cell's resource allocation is capable of accommodating modifications; however, in some cases (e.g., where the cell 202 is powered by small, compact sources with limited resources), changes to resource allocations could be detrimental. In such a limited case, the lack of resources might prevent the cell monitor $302_3$ from determining whether a resource allocation change can be accommodated. Under such conditions, the cell monitor $302_3$ functions mainly as a resource enforcer, while referring issues of resource allocation to a more powerful agent outside of the cell 202 (e.g., an agent in an associated supercell 206).

In further embodiments, the cell monitor $302_3$ also maintains a history of the general health of the cell 202, its resources, and the statuses of other agents 302 within the cell 202. To this end, the cell monitor $302_3$ may, under certain conditions, terminate unstable agents 302 or restart agents 302 that have terminated abnormally. In this manner, the cell monitor $302_3$ substantially ensures that the failure of one agent 302 within the cell 202 does not necessarily affect the activities of other agents 302 within the cell 202. The cell monitor $302_3$ may forward the cell's history to a more powerful, higher-level entity in the system 100 for further cognitive analysis; however, the cell monitor $302_3$ is, at a minimum, capable of making simple deductions based on uncomplicated rules regarding actions that may cause disruptive behavior or performance bottlenecks. This minimum capability substantially ensures cell autonomy, while maintaining simplicity at the cell component level.

In further embodiments still, the cell monitor $302_3$ also is capable of producing internal agents 302 to support tasks within the cell 202. For instance, if the cell 202 acts as a coordinator for agents 302 from other cells (e.g., were the other agents are offering feedback in response to a query from an agent 302 in the cell 202), the cell monitor $302_3$ may produce a query agent (e.g., agent $302_n$ in FIG. 2) to coordinate and monitor the collaboration for as long as the session lasts. In one embodiment, agents 302 that are produced by the cell monitor $302_3$ are short-lived and may disappear once they have served their purpose (e.g., in the case of the produced query agent, once the collaboration session ends).

Agent $302_1$ is a gatekeeper/keymaster. The gatekeeper is a static agent 302 that is responsible for an internal task (e.g., internal to the cell 202), namely, controlling access to the cell 202 by monitoring and verifying all traffic entering the cell 202, while the keymaster is a static agent 302 monitors and encrypts all traffic leaving the cell 202. In one embodiment, the gatekeeper and keymaster functions are integrated in a single gatekeeper/keymaster agent 302. In an alternate embodiment, the gatekeeper and keymaster functions are associated with two separate agents 302 whose functions are tightly integrated.

Resources 304 are attached to the cell 202 and are available to agents 302 for use in furtherance of their assigned tasks. Resources 304 can be dynamically added and removed from a cell 202 without substantial modification to the cell structure or to agents operating within the cell's borders. In one embodiment, a resource 304 is an extension into a physical device. In another embodiment, a resource 304 is an access portal to, for example, an expert system, a visualization model or a processing element (e.g., for filtering, analyzing and/or interpreting data). In this embodiment, treating software-only resources as resources 304 simplifies the agents 302, because agents 302 do not have to be custom-built for each device that they monitor (i.e., the agents 302 simply use different resources 304).

Resources 304 may exist within the cell 202, or the resources 304 may be located outside of the cell as remote resources 304. Remote resources 304 are useful where the associated resource does not allow software to be installed thereon and the only access mechanism is through a serial port or similar interface. Remote resources 304 are attached directly to a piece of hardware and are connected to a cell 202 through a secure tunnel. To agents 302 within the cell 202, however, remote resources 304 appear local. Remote resources 304 may be implemented, for example, where small, limited resource devices are directly attached to a piece of hardware located a distance from the cell 202.

In one embodiment, resources 304 comprise two main parts: a resource interface $306_1$-$306_n$ (hereinafter collectively referred to as "resource interfaces 306") and a resource agent 302 (in FIG. 3, agents $302_5$, $302_6$, $302_7$ and $302_8$ are resource agents). The resource interface 306 comprises code that allows the associated resource (e.g., device) to be interfaced to, to be queried and to be controlled. The code identified variables, syntax and mechanisms that can be used to interact with the associated resource. For example, for a Simple Network Management Protocol (SNMP) compliant resource, the manufacturer-supplied management information base (MIB) defines the variables that can be interrogated.

The resource agent 302 is a static, semi-autonomous agent layered on the associated resource interface 306 and tasked specifically with presenting a common interface (e.g., a Java interface) for the associated resource to other agents 302 within the cell 202. The resource agent 302 controls data entering the cell 202 form the associated resource and acts as a bridge between the resource's driver element and the interaction interface seen by agents 302 within the cell 202. The advantages of permanently attaching an agent 302 (i.e., a resource agent 302) to a resource interface 306 are many. For instance, the resource agent 302 presents a common interface for other agents 302 seeking access to the associated resource, thereby substantially reducing the complexity and number of different interfaces (e.g., other agents 302 do not need different sets of interfaces for each resource that they want to access). Any agent 302 within the cell 202 can access any resource 304 regardless of the resource type, subject to any restrictions imposed by the cell monitor $302_3$.

In addition, the resource agent 302 assumes the task of gathering data. Thus, another agent 302 that is charged with analysis does not have to concern itself with periodically polling devices, maintaining a history or data validation, prioritizing or archiving. The resource agent 302 maintains the resource's data space and makes the data space available (e.g., via a live feed or via the resource agent's archive) for any agent 302 that is authorized to access the data space. Tasking the resource agent 302 with creating and controlling the resource's data space allows other agents 302 to focus on their respective tasks without having to assemble or maintain their respective data sources. In one embodiment, the resource agent 302 negotiates with the cell monitor 302$_3$ for space allocated to the resource's data, which is assigned out of a storage pool associated with the cell 202.

In one embodiment, the resource agent 302 can initiate alerts (e.g., for resource condition violations) based on information (e.g., in the form of an SNMP trap or as a result of processing polled data) received from the resource interface 306. The resource agent 302 examines data coming from the resource interface 306 for violations of conditions defined by the agent 302 monitoring the associated resource, unless the data is in the form of an SNMP trap. In one embodiment, if the resource agent 302 detects a condition violation, the resource agent 302 generates an alert and forwards the alert to a higher-level entity in the system 100. In another embodiment, SNMP traps received from the resource interface 306 are automatically forwarded by the resource agent 302 to another agent 302 for action.

Figure 4:
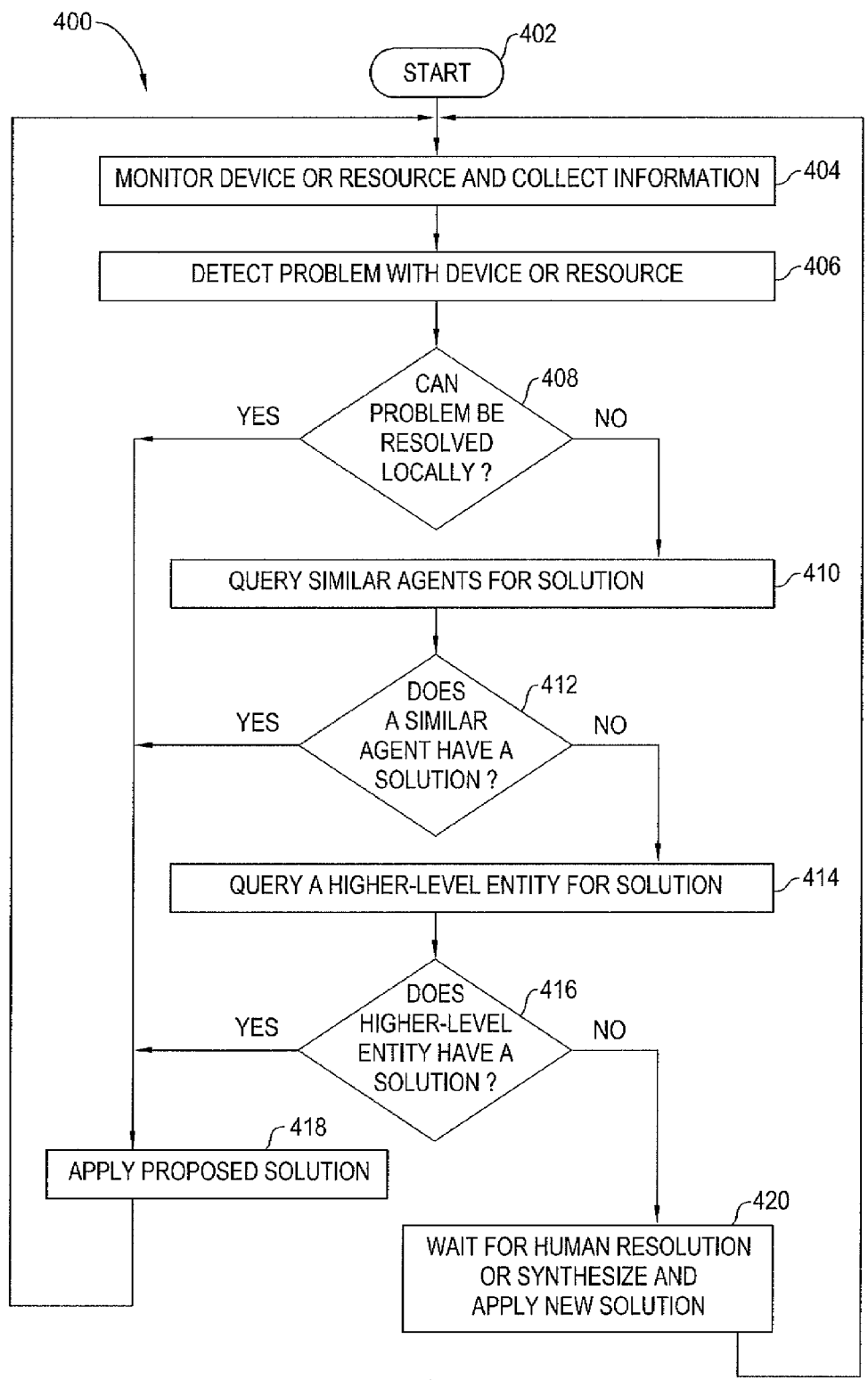
FIG. 4 is a flow diagram illustrating one embodiment of a method for agent behavior in a hierarchical system, according to the present invention.

FIG. 4 is a flow diagram illustrating one embodiment of a method 400 for agent behavior in a hierarchical system, according to the present invention. The method 400 may be implemented, for example, at an agent that has been deployed to monitor a device or a resource in a distributed network.

The method 400 is initialized at step 402 and proceeds to step 404, where the method 400 monitors the device or resource to which the associated agent is assigned. As the method 400 monitors this device or resource, information about the operating environment and about the device or resource is collected. The method 400 continues to monitor the device or resource through execution.

In step 406, the method 400 detects a problem with the monitored device or resource. For example, referring back to the a networking company example discussed with reference to FIGS. 1 and 2 (i.e., where the networking company was represented by a biosphere 106, the company's customers were represented by ecospheres 104 and individual customer locations were represented by hives 102), consider the following example: an agent in a first cell at the customer location (hive) detects a problem with a switch that it is monitoring.

The method 400 then proceeds to step 408 and determines whether the problem can be resolved locally, based on the information collected through monitoring of the device or resource. That is, the method 400 determines, by examining the rule set and local experience associated with the agent at which the method 400 is executing, whether the associated agent is capable of identifying and applying the appropriate solution or corrective action.

If the method 400 determines in step 408 that the problem can be resolved locally, the method 400 proceeds to step 418 and applies the proposed solution before returning to step 404 and resuming monitoring of the device or resource.

Alternatively, if the method 400 determines in step 408 that the problem cannot be solved locally, the method 400 proceeds to step 410 and queries similar agents (e.g., agents monitoring similar devices or resources) in the hierarchical system for a solution. In one embodiment, the query initiates a collaboration of other agents (e.g., internal and/or external to the cell containing the agent at which the method 400 is executing), for example with the assistance of a resource manager, which in turn activates a query agent.

In one embodiment, at least one of the other agents that are queried belongs to the same federation as the agent on which the method 400 is executing. In another embodiment, at least one of the other agents that are queried belongs to the same hive, but not necessarily the same federation, as the agent on which the method 400 is executing. In yet another embodiment, at least one of the other agents that are queried is outside of the hive including the agent on which the method 400 is executing. The idea is that other agents monitoring similar devices or resources may have observed the same or similar problems in the past and consequently may know what needs to be done to resolve the problem. This past experience may be embodied in an agent's local operating environment rule set.

In step 412, the method 400 determines whether any of the queried agents has proposed a solution. In one embodiment, any proposed solutions are received via the query agent. If the method 400 determines in step 412 that at least one of the queried agents has proposed a solution, the method 400 proceeds to step 418 and applies the proposed solution before returning to step 404 and resuming monitoring of the device or resource. That is, the method 400 applies the proposed solution from the agent on which the method 400 is executing.

Alternatively, if the method 400 determines in step 412 that none of the queried agents has proposed a solution, the method 400 proceeds to step 414 and queries a higher-level entity (e.g., a supercell) for a solution. The idea is that the higher-level entity, which is more intelligent than the agent and also has observed and logged referred problems from other lower-level entities (e.g., agents and cells), may have observed the same or similar problems in the past and consequently may know what needs to be done to resolve the problem.

In step 416, the method 400 determines whether the higher-level entity has proposed a solution. If the method 400 determines in step 416 that the higher-level entity has proposed a solution, the method 400 proceeds to step 418 and applies the proposed solution before returning to step 404 and resuming monitoring of the device or resource.

Alternatively, if the method 400 determines in step 416 that the higher-level entity has not proposed a solution, the method 400 proceeds to step 420 and waits for human resolution of the problem. Human intervention is thus the last resort of the method 400. Alternatively, the method 400 may synthesize and apply a new solution in step 420. Once a human or agent-synthesized solution has resolved the problem, the method 400 returns to step 404 and continues to monitor the device or resource. In one embodiment, the method 400 retains the applied solution as a new rule in short-term memory and archives the solution with a supercell 206 associated with the agent at which the method 400 is executing.

Figure 5:
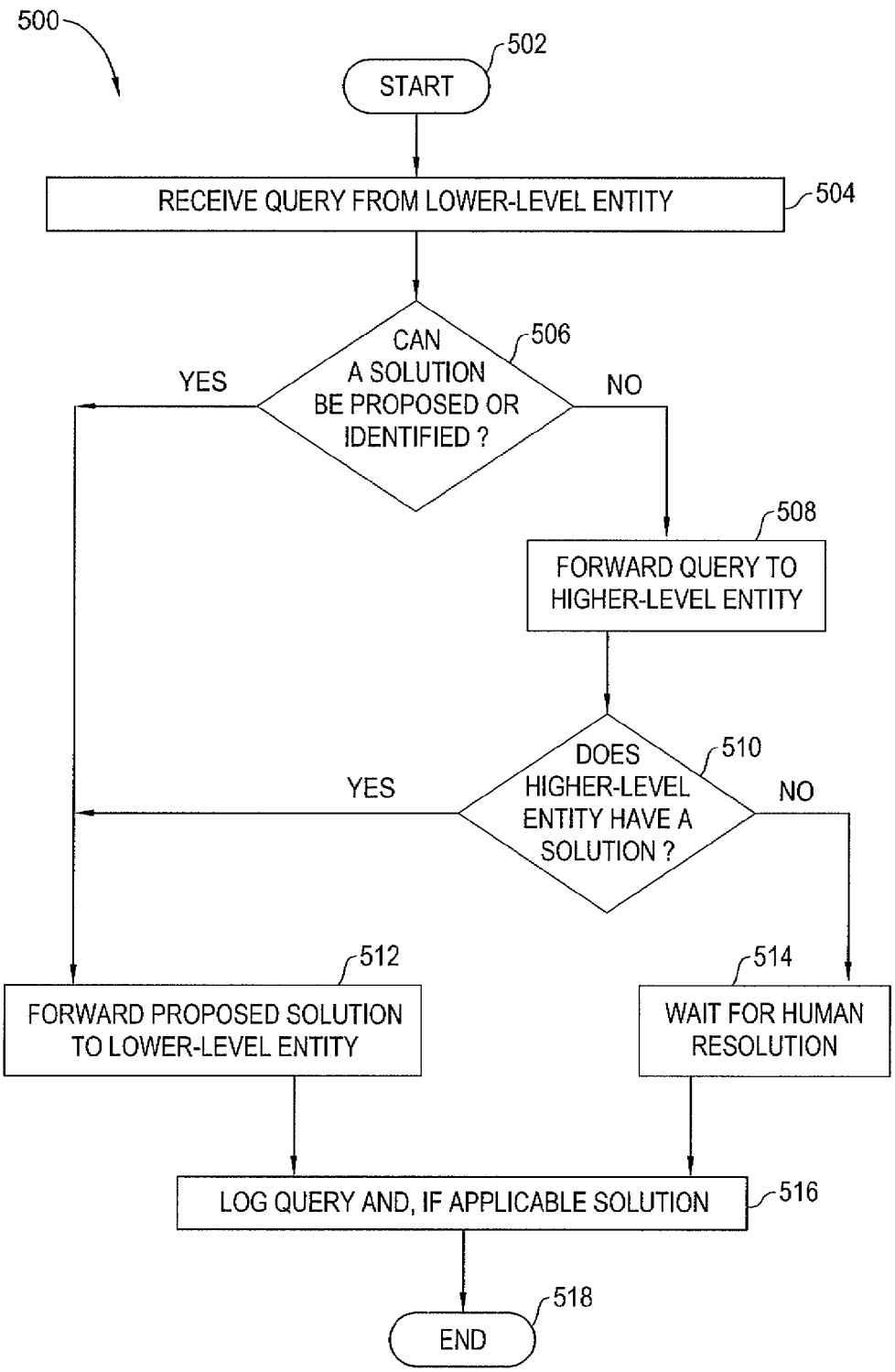
FIG. 5 is a flow diagram illustrating one embodiment of a method for handling queries for problem solutions, according to the present invention.

FIG. 5 is a flow diagram illustrating one embodiment of a method 500 for handling queries for problem solutions, according to the present invention. The method 500 may be implemented, for example, at an entity in the system 100 that monitors or oversees another entity or group of entities (e.g., a supercell, an ecosphere or a biosphere).

The method 500 is initialized at step 502 and proceeds to step 504, where the method 500 receives a query from a lower-level entity (e.g., an agent in a cell). The query relates to a problem for which the lower-level entity is seeking a solution (e.g., because the lower-level entity is unable to solve the problem itself).

In step 506, the method 500 determines whether it can identify or propose a solution to the query. In one embodiment, the method 500 has access to a log of previous queries and solutions involving the entity at which the method 500 is executing, such that a proposed solution can be based on the entity's previous observations and experience. If the method 500 determines in step 506 that it can propose a solution, the method 500 forwards the proposed solution to the lower-level entity in step 512. The method 500 then logs the query and associated solution (e.g., in a local operating environment rule set) in step 516 before terminating in step 518.

Alternatively, if the method 500 determines in step 506 that it cannot proposed a solution, the method 500 proceeds to step 508 and forwards the query to a higher-level entity (e.g., a biosphere 106). In step 510, the method 500 determines whether the higher-level entity has provided a solution. If the method 500 determines in step 510 that the higher-level entity has provided a solution, the method 500 proceeds to step 512 and forwards the proposed solution to the lower-level entity as described above.

Alternatively, if the method 500 determines in step 510 that the higher-level entity has not provided a solution, the method 500 proceeds to step 514 and waits for human resolution of the problem. The method 500 then proceeds to step 516 and logs the query and, if provided, the solution, as described above.

In one embodiment, if the problem reported in the query has been exhibited by a group of related cells or agents, a higher-level entity (e.g., an ecosystem 104) might be compelled to issue a targeted change (e.g., a rule change, an operating system update, etc.) specifically for those cells or agents. In such a case, other cells or agents would not see the targeted changes, even if they are monitoring the same types of devices.

Figure 6:
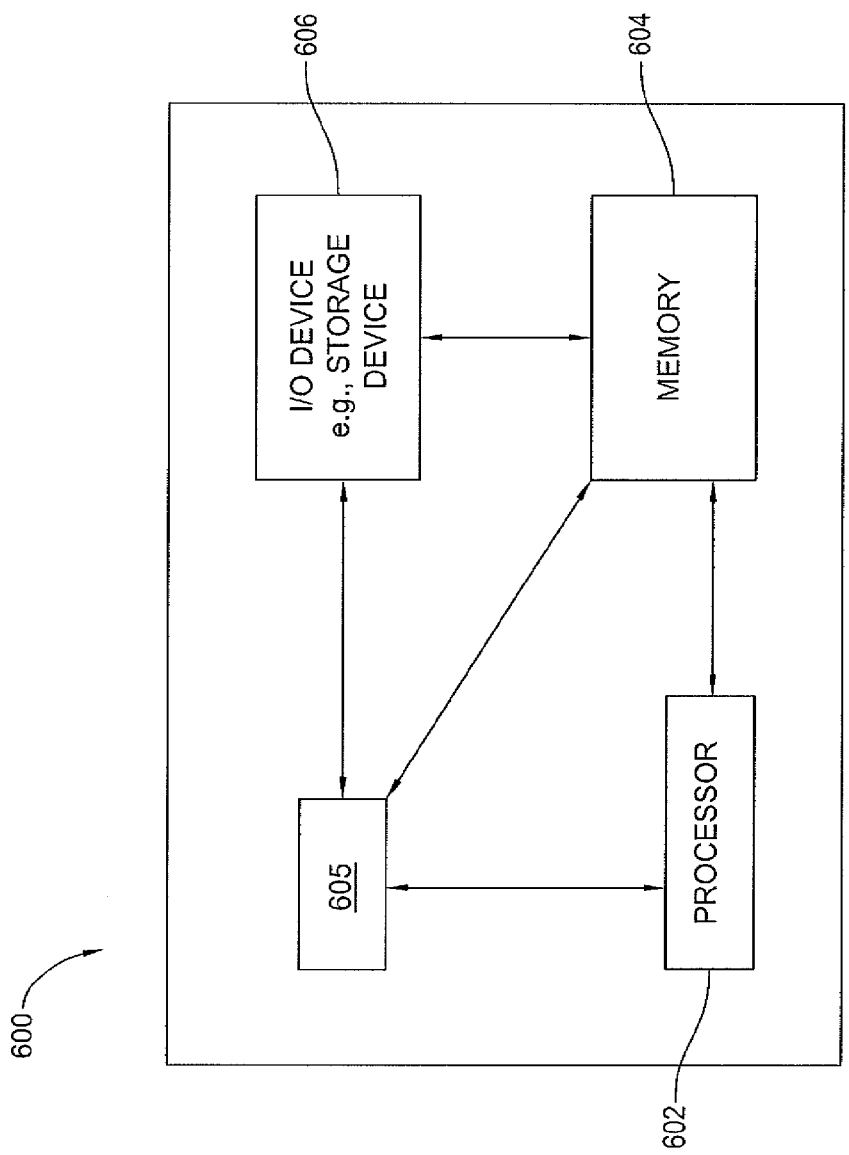
FIG. 6 is a high level block diagram of the query method that is implemented using a general purpose computing device.

FIG. 6 is a high level block diagram of the query method that is implemented using a general purpose computing device 600. In one embodiment, a general purpose computing device 600 comprises a processor 602, a memory 604, a query module 605 and various input/output (I/O) devices 606 such as a display, a keyboard, a mouse, a modem, and the like. In one embodiment, at least one I/O device is a storage device (e.g., a disk drive, an optical disk drive, a floppy disk drive). It should be understood that the query module 605 can be implemented as a physical device or subsystem that is coupled to a processor through a communication channel.

Alternatively, the query module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the query module 605 for referring and resolving problems among different levels of a computing system described herein with reference to the preceding Figures can be stored on a computer readable medium or carrier (e.g., RAM, magnetic or optical drive or diskette, and the like).

Thus, the present invention represents a significant advancement in the field of distributed computing systems. A system is provided that organizes software agents into a hierarchy that supports substantially autonomous functionality by grouping agents according to how they relate to other agents. This facilitates the coordination and control of large numbers of agents. Moreover, such a system may use its collective knowledge to examine archived data for trends that point to potential future malfunctions. This predictive capability can substantially reduce the occurrence of costly system failures. Thus, while the hierarchical system implements some types of centralized control mechanisms for tasks such as problem solving, the system also retains some of the advantages of distributed systems such as survivability, robustness and reliability.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for resolving a problem in a computer network, the problem being detected by an agent deployed within the computer network, comprising:
receiving, by a processor of a supercell, a query from the agent, the query describing the problem and requesting a solution, wherein the agent is one of a plurality of agents distributed throughout a customer location as software entities deployed on a plurality of servers, each of the plurality of agents being deployed to monitor and control one of a plurality of components, wherein each one of the plurality of agents modifies its behavior by learning from past experiences to synthesize a new problem solution, wherein the plurality of agents comprises a static agent and a mobile agent, wherein the static agent remains in one location and the mobile agent migrates from a location by physically leaving the location, wherein the plurality of agents comprises a cell monitor agent that allocates resources amongst the plurality of agents based upon policies defining resource usage and the cell monitor a ent estimates how to support agent and resource changes based upon the past experiences and a guideline established when the cell monitor agent was created a gatekeeper that monitors and verifies all traffic entering a cell in which the gatekeeper is located, a keymaster located in the cell that encrypts all traffic leaving the cell, and a resource agent that presents a common interface for an associated resource to other agents within the cell, wherein the supercell ensures a network of the customer location operates at a predefined level and provides supplemental decision making capabilities to the plurality of agents;
providing, by the processor, the solution to the agent, when the solution is identified locally; and
forwarding, by the processor, the query to a more-powerful decision-making entity in the computer network, when the solution is not identified locally.

2. The method of claim 1, further comprising:
receiving the solution from the more-powerful decision-making entity; and
forwarding the solution to the agent.

3. The method of claim 2, further comprising:
archiving the problem.

4. The method of claim 2, further comprising:
archiving the solution.

5. The method of claim 1, wherein the agent comprises a plurality of agents, where each of the plurality of agents is deployed to directly monitor and control one component of the plurality of components of the computer network.

6. The method of claim 5, wherein a subset of the plurality of agents is grouped into a federation for solving a common problem.

7. A non-transitory computer-readable medium storing a plurality of instructions, which when executed by a processor of a supercell, cause the processor to perform operations for resolving a problem in a computer network, the problem being detected by an agent deployed within the computer network, the operations comprising:

receiving a query from the agent, the query describing the problem and requesting a solution, wherein the agent is one of a plurality of agents distributed throughout a customer location as software entities deployed on a plurality of servers, each of the plurality of agents being deployed to monitor and control one of a plurality of components, wherein each one of the plurality of agents modifies its behavior by learning from past experiences to synthesize a new problem solution, wherein the plurality of agents comprises a static agent and a mobile agent, wherein the static agent remains in one location and the mobile agent migrates from a location by physically leaving the location, wherein the plurality of agents comprises a cell monitor agent that allocates resources amongst the plurality of agents based upon policies defining resource usage and the cell monitor agent estimates how to support agent and resource changes based upon the past experiences and a guideline established when the cell monitor agent was created, a gatekeeper that monitors and verifies all traffic entering a cell in which the gatekeeper is located, a keymaster located in the cell that encrypts all traffic leaving the cell, and a resource agent that presents a common interface for an associated resource to other agents within the cell, wherein the supercell ensures a network of the customer location operates at a predefined level and provides supplemental decision making capabilities to the plurality of agents;

providing the solution to the agent, when the solution is identified locally; and forwarding the query to a more-powerful decision-making entity in the computer network, when the solution is not identified locally.

8. The non-transitory computer-readable medium of claim 7, further comprising:

receiving the solution from the more-powerful decision-making entity; and forwarding the solution to the agent.

9. The non-transitory computer-readable medium of claim 8, further comprising:

archiving the problem.

10. The non-transitory computer-readable medium of claim 8, further comprising:

archiving the solution.

11. The non-transitory computer-readable medium of claim 7, wherein the agent comprises a plurality of agents, where each of the plurality of agents is deployed to directly monitor and control one component of the plurality of components of the computer network.

12. The non-transitory computer-readable medium of claim 11, wherein a subset of the plurality of agents is grouped into a federation for solving a common problem.

13. An apparatus for resolving a problem in a computer network, the problem being detected by an agent deployed within the computer network, comprising:

a processor of a supercell; and a non-transitory computer-readable medium storing a plurality of instructions, which when executed by the processor, cause the processor to perform operations, the operations comprising:

receiving a query from the agent, the query describing the problem and requesting a solution, wherein the agent is one of a plurality of agents distributed throughout a customer location as software entities deployed on a plurality of servers, each of the plurality of agents being deployed to monitor and control one of a plurality components wherein each one of the plurality of agents modifies its behavior by learning from past experiences to synthesize a new problem solution, wherein the plurality of agents comprises a static went and a mobile agent, wherein the static agent remains in one location and the mobile agent migrates from a location by physically leaving the location, wherein the plurality of agents comprises a cell monitor agent that allocates resources amongst the plurality of agents based upon policies defining resource usage and the cell monitor agent estimates how to support agent and resource changes based upon the past experiences and a guideline established when the cell monitor a ent was created, a gatekeeper that monitors and verifies all traffic entering a cell in which the gatekeeper is located, a keymaster located in the cell that encrypts all traffic leaving the cell, and a resource agent that resents a common interface for an associated resource to other agents within the cell, wherein the supercell ensures a network of the customer location operates at a predefined level and provides supplemental decision making capabilities to the plurality of agents;

providing the solution to the agent, when the solution is identified locally; and forwarding the query to a more-powerful decision-making entity in the computer network, when the solution is not identified locally.

14. The apparatus of claim 13, further comprising:

receiving the solution from the more-powerful decision-making entity; and forwarding the solution to the agent.

15. The apparatus of claim 14, further comprising:

archiving the problem.

16. The apparatus of claim 14, further comprising:

archiving the solution.

17. The apparatus of claim 13, wherein the agent comprises a plurality of agents, where each of the plurality of agents is deployed to directly monitor and control one component of the plurality of components of the computer network.

18. The apparatus of claim 17, wherein a subset of the plurality of agents is grouped into a federation for solving a common problem.

* * * * *